US012774879B2

(12) United States Patent
Eckardt et al.

(10) Patent No.: US 12,774,879 B2
(45) Date of Patent: Oct. 27, 2026

(54) AUTOMATED TEST PLAN VALIDATION FOR OBJECT MEASUREMENT BY A COORDINATE MEASURING MACHINE

(71) Applicant: Carl Zeiss Industrielle Messtechnik GmbH, Oberkochen (DE)

(72) Inventors: Nils Eckardt, Plüderhausen (DE); Stephan Rieger, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 372 days.

(21) Appl. No.: 18/626,865

(22) Filed: Apr. 4, 2024

(65) Prior Publication Data

US 2024/0247925 A1 Jul. 25, 2024

Related U.S. Application Data

(63) Continuation of application No. 17/065,912, filed on Oct. 8, 2020, now Pat. No. 11,976,920.

(30) Foreign Application Priority Data

Oct. 8, 2019 (EP) .................................... 19201829

(51) Int. Cl.
*G01B 5/008* (2006.01)
*G01B 11/00* (2006.01)

(52) U.S. Cl.
CPC ............ *G01B 5/008* (2013.01); *G01B 11/005* (2013.01)

(58) Field of Classification Search
CPC .... G01B 5/008; G01B 11/005; G01B 21/042; G01B 21/045
See application file for complete search history.

(56) References Cited

U.S. PATENT DOCUMENTS

2004/0239905 A1* 12/2004 Rhee .................... G03F 7/70508 355/53
2014/0157861 A1* 6/2014 Jonas .................... G01B 5/0014 73/1.79

(Continued)

FOREIGN PATENT DOCUMENTS

WO WO-2017121468 A1 * 7/2017 ............. G01B 21/04

OTHER PUBLICATIONS

Hu et al. "Design, Implementation, and Testing of Advanced Virtual Coordinate-Measuring Machines", IEEE, vol. 61, No. 5; May 2012; https://ieeexplore.ieee.org/stamp/stamp.jsp?tp=&arnumber=6099614 (Year: 2012).*

(Continued)

*Primary Examiner* — Lal Ce Mang
(74) *Attorney, Agent, or Firm* — Miller Johnson

(57) ABSTRACT

A computer device includes memory that stores a test plan for a coordinate measuring machine to perform an object measurement. The test plan includes at least one test feature for a plurality of reference elements of the object. The computer device includes at least one processor configured to execute instructions stored in the memory. The instructions include, for each of the reference elements, obtaining at least one accuracy variable. The accuracy variable specifies an accuracy of the measurement result of a respective reference element. The instructions include ascertaining an error effect of each reference element on the quantification of the test feature based on the respective accuracy variable. The instructions include ascertaining for each of the error effects whether it meets an error criterion and, if so, classifying a reference element assigned to this error effect as a critical reference element.

18 Claims, 4 Drawing Sheets

(56) References Cited

U.S. PATENT DOCUMENTS

| | | | | |
|---|---|---|---|---|
| 2014/0222373 A1* | 8/2014 | Sprenger | G01B 5/008 702/155 |
| 2018/0045511 A1* | 2/2018 | Georgi | G01B 21/04 |

OTHER PUBLICATIONS

Moroni et al. "Optimal Inspection Strategy Planning for Geometric Tolerance Verification", Science Direct, Aug. 1, 2013; https://www.sciencedirect.com/science/article/pii/S0141635913001323 (Year: 2013).*

Hu et al., "Design, Implementation, and Testing of Advanced Virtual Coordinate-Measuring Machines", IEEE Transactions on Instrumentation and Measurement, vol. 61, No. 5, May 2012, pp. 1368-1376.

Moroni et al., "Optimal inspection strategy planning for geometric tolerance verification", Precision Engineering, vol. 38, 2014, pp. 71-81.

Moroni et al., "Coordinate Measuring Machine Measurement Planning", Geometric Tolerences, Springer, Jan. 1, 2011, pp. 111-158.

* cited by examiner

AUTOMATED TEST PLAN VALIDATION FOR OBJECT MEASUREMENT BY A COORDINATE MEASURING MACHINE

CROSS-REFERENCE TO RELATED APPLICATIONS

This application is a continuation of U.S. patent application Ser. No. 17/065,912 filed Oct. 8, 2020, which claims priority to European Application No. 19 201 829.9 filed Oct. 8, 2019. The entire disclosures of the above applications are incorporated by reference.

FIELD

The present disclosure relates to coordinate measuring machine (CMM) measurement of objects and more particularly to automated validation of test plans for CMM measurement of objects.

BACKGROUND

Background to the technical field of object measurement by means of test plans is explained below. In so doing, all features, variants and embodiments may also be provided for, or applied to, the invention disclosed herein.

The generation of so-called test plans for testing or measuring workpieces is known. Such a test plan defines parameters of a test process, by means of which the quality of a workpiece or object to be measured can be determined. By way of example, such a test plan can be defined on the basis of certain general standards or manufacturer or customer specifications.

The test plan can be carried out by a testing or measuring apparatus, for example by a coordinate measuring machine (CMM), which preferably captures three-dimensional coordinates of an object, in particular surface coordinates, within the scope of the test. The test plan can comprise digital data, digital parameters, program instructions and/or an algorithm which prompts/prompt a testing apparatus (e.g., a CMM) to carry out the testing process as per the test plan (e.g., as per the relationships and/or parameters defined therein).

In general, the test plan can be a file or computer program which is readable and/or performable by a control device, wherein the control device is preferably comprised by a test apparatus (for example, a CMM), which should implement the test plan.

By way of example, the test plan can define (in particular digital and/or programmed) work instructions for carrying out a desired object test, for example in the form of commands. In addition or as an alternative thereto, the test plan can define the test parameters to be set for the implementation and data generation, e.g., lighting parameters or probing forces, and/or the test components to be used for the implementation, e.g., sensors. Additionally, a test plan can contain test parameters, which can be set or altered while the test is running, e.g., in order to adapt later (partial) test processes.

As a further addition or alternative thereto, a test trajectory, e.g., of a sensor, to be traversed for carrying out the test can be defined by the test plan. The test result documentation can also be defined by the test plan.

Likewise, the test plan can contain information items in respect of a relative position and shape of the workpiece to be tested, e.g., in a test coordinate system, and/or information items in relation to target values of test features. Information items relating to the shape can be contained in the test plan, for example in the form of a CAD model. Such a CAD model can also define the aforementioned target values. In addition or as an alternative thereto, the test plan can comprise tolerance specifications for a test feature.

Actual information items generated while the test plan is carried out, e.g., measurement points, coordinate values, images or measurement values, can likewise be stored in the test plan.

On the basis of the test plan, measurement points to be captured by a measuring device or, expressed differently, by a measuring apparatus, which measurement points are needed to evaluate the test features defined in the test plan, can be defined and/or read. Subsequently, a measurement procedure can be defined in order thereby to capture measurement points, for example on the surface of the workpiece to be measured. The measurement procedure defined thus is worked through by the measuring apparatus (e.g., in the form of a CMM) in a test step or a measurement step, as a result of which the required measurement points (and the spatial coordinates thereof, in particular) are subsequently captured and stored according to the measurement procedure defined by the test plan. Thereafter, the individual test features of the test plan are evaluated on the basis of the recorded measurement points and/or the coordinates obtained, and as a consequence, the data necessary for creating a measurement protocol are obtained.

Expressed in general, a test plan can consequently contain prescriptions (e.g., in the form of measurement points to be captured), which directly or indirectly describe a desired measurement procedure.

In particular, the test plan can contain or define the test features, to be tested, of a workpiece to be measured and/or information items in relation to these test features. Test features can be quality criteria, in particular of the dimensional type, the observance of which should be checked during the test process. Expressed differently, a test feature can represent a dimensional property of at least one defined geometric element (measurement element) on a measurement object. Examples of test features include the spacing of the center points of two bores, the deviations of measurement points on a free-form surface with respect to a target form, the location of the center point of a bore, the diameter of a bore, the position of a measurement element in a reference coordinate system, etc.

SUMMARY

As a rule, when test plans are created, the test features to be checked are initially identified. Each of these test features has measurement elements assigned, said measurement elements needing to be measured for the purposes of checking the test features. In more detail, for the purposes of quantifying a test feature which relates to a certain measurement element or, expressed differently, which is defined on the basis thereof, it is necessary, as a rule, to record measurement points of said measurement element. Typically, a coordinate measurement value is ascertained for such a measurement point in the currently considered field of coordinate metrology. As a result of this, it is then possible to calculate spatial degrees of freedom (in particular the complete spatial position and orientation, i.e., the relative position) and/or dimensions of the measurement element.

Here, reference is made to a dependence between test feature and measurement element if, in general, the measurement element must be probed and/or measured for the purposes of checking (in particular quantifying) the test feature. Such a measurement element represents a reference element for the test feature since it forms a reference to be measured for the purposes of quantifying the test feature.

The relationship between test features and reference elements and their possible effects on the accuracy of an object measurement is only difficult to comprehend, in particular for less experienced operators. It was found that, within the scope of an object measurement, this therefore often led to an unnecessary not-in-order assessment of test features, even though this does not correspond to the conditions on the real object or component.

A solution for planning test strategies by means of virtual coordinate measuring machines is disclosed in:

Yang Hu et al.: "Design, Implementation, and Testing of Advanced Virtual Coordinate-Measuring Machines", IEEE Transactions on Instrumentation and Measurement, IEEE Service Center, Piscataway, NJ, US, vol. 61, No. 5, 1 May 2012 (2012-05-01), pages 1368-1376, XP011440639, ISSN: 0018-9456, DOI: 10.1109/TIM.2011.2175828.

US 2014/157861 A1 discloses a solution for correcting temperature deviation when measuring similar workpieces in succession. Further technological background is found in WO 2017/121468 A1 and in the two following publications:

Giovanni Moroni et al.: "Optimal inspection strategy planning for geometric tolerance verification", Precision Engineering, vol. 38, No. 1, 1 Jan. 2014 (2014-01-01), pages 71-81, XP055683426, Amsterdam, NL, ISSN: 0141-6359, DOI: 10.1016(j.precisioneng.2013.07.006;

Giovanni Moroni et al.: "Coordinate Measuring Machine Measurement Planning", 1 Jan. 2011 (2011-01-01), Geometric Tolerances, Springer, Pages 111-158, XP099177945, ISBG: 978-1-84996-310-7.

One object of the present invention is to improve the measurement of workpieces using a coordinate measuring machine, in particular to the effect of workpieces being incorrectly assessed as not in order having a lower probability.

This object is achieved by a method and a computer device according to the accompanying independent claims. Advantageous developments are specified in the dependent claims.

It should again be stressed that the features, embodiments and definitions mentioned in the introductory part of the description can also be provided, either on their own or in any combination, in the solution disclosed in the present case. In particular, this relates to all embodiments and definitions of test plans, test features, measurement elements and reference elements.

According to the invention, it was recognized that a frequent cause for unjustified not-in-order assessments of test features is that these test features are only measured with an insufficient accuracy. In particular, it was recognized that already the measurement of the reference elements was often only possible with a restricted and partly insufficient accuracy. By way of example, should the test features now be ascertained by computation (i.e., quantified) on the basis of these measurements of the reference elements, not-in-order assessments may arise even though this is not reflected on the real component.

More precisely, a user has previously only been able to a restricted extent to reliably ascertain a cause of error for a negative assessment of test features. Naturally, the object as such and, more precisely, a lack of quality thereof, may be a cause for measurement results outside of an admissible tolerance. However, the definition of the test plan and the features and measurement elements comprised thereby may also, at least in part, be, on the other hand, the cause of such an assessment and/or such measurement results. By way of example, a test feature can be predominantly therefore assessed as not in order because the underlying measurement elements, which are assigned to this feature as reference elements or which serve as reference elements for this test feature and are measured to this end, are only measurable with insufficient accuracy.

However, identifying such a cause of error becomes complex, in particular, if measurement results of the reference elements were themselves ascertained, at least in part, on the basis of measurements of other measurement elements, i.e., the test feature is dependent on a plurality of measurement elements that are based on one another.

An operator may require much experience and time to find out whether the fact that a test feature assessed as not in order can be in fact traced back predominantly to the component or else predominantly to the definition of the test plan and the reference elements set therein, which may possibly only be measurable inaccurately. High reject rates may arise if such a test is omitted since objects are assessed as not in order to an unnecessarily great extent.

It is therefore proposed to consider accuracy variables for reference elements on which a test feature depends. These can generally specify an accuracy with which such a reference element is measurable or, expressed differently, an accuracy with which a measurement result of the reference element is ascertainable.

By way of example, from this it is possible to ascertain whether the test feature depends on reference elements that are only measurable inaccurately. Such an ascertainment can be implemented automatically, for example on the basis of an automatically ascertained (in particular, calculated) error effect of the reference elements on the quantification of the test feature. The error effect can specify an in particular falsifying impact or a falsifying effect, which the reference element has on the quantification of the test feature.

By way of example, this may render it possible to determine that the cause for the unacceptable test feature values may be the only inaccurately measurable measurement elements and not necessarily the object as such.

Then, an operator can adopt suitable countermeasures and/or appropriate countermeasures can be ascertained automatically and/or proposed automatically and/or, where applicable, also implemented automatically. The countermeasures may comprise an adaptation of the measurement of the reference elements such that the accuracy is increased, or a new definition of the test feature and/or a new selection of the reference elements to be measured, for example by adapting the dependencies.

Thus, this creates options (for example, by ascertaining the error effect) for being able to identify impairments of the quantification of the test feature as a result of only inaccurately measurable reference elements and/or indicate these to an operator. As a result, the operator is unburdened of ascertaining errors themselves, which also reduces the requirements in respect of qualification and experience of the operator. Further, setting up the test plan is accelerated since possible error effects need not be established first in iterative fashion, and the quality of a generated test plan and the test feature values ascertainable thereby is increased. As a consequence, this also reduces the risk of objects satisfying the test features of incorrectly being assessed as not in order as a result of the test feature ascertainment being susceptible to errors on account of a dependence on reference elements only measurable inaccurately and being subject to a high measurement uncertainty.

In detail, a method for validating a test plan for the object measurement using a coordinate measuring machine is proposed, wherein the test plan contains at least one test feature which should be quantified within the scope of the object measurement, wherein the quantification of the test feature should be implemented on the basis of a measurement result of at least one reference element of the object; wherein the method comprises:

obtaining at least one accuracy variable which specifies an accuracy of the measurement result of the reference element;

ascertaining an error effect of the reference element on the quantification of the test feature on the basis of the accuracy variable.

Here, according to the invention, a plurality of reference elements of the object are measured and the accuracy variables and error effects thereof are determined, even if the subsequent description in part is only directed at one reference element or the aforementioned at least one reference element.

The coordinate measuring machine can be a measuring apparatus for recording three-dimensional (i.e., spatial) measurement point coordinates, wherein the measurement points can preferably lie on a component surface and/or in a component interior (for example, in the case of a computed tomography coordinate measuring machine). The coordinate measuring machine can be embodied in any conventional design, in particular as an apparatus comprising preferably a plurality of drivable machine shafts for positioning a measurement sensor relative to the object. By way of example, at least two linear shafts can be provided, which are preferably orthogonal to one another. In particular, the coordinate measuring machine can be embodied as a portal type or bridge type.

The coordinate measuring machine can capture the object in tactile fashion (for example, by probing using a measuring probe) or in contactless fashion (e.g., by means of an optical sensor). The object can be an industrially produced component. The measurement can be carried out within the scope of quality control, for example of object or component manufacturing in series.

The measurement result can contain at least one measurement value or be such a measurement value. The test feature can be quantified on the basis of and, in particular, by computational combination of the measurement result and/or measurement value. Predetermined computing rules can be applied to this end, depending on the test feature. By way of example, center coordinates of two circles or bores can be determined as measurement result and, from this, the spacing of these centers as a test feature can be determined by simple subtraction.

As a constituent part of the invention presented herein, provision can also be made for the test plan to be actually carried out, for measurement results of a reference element to be ascertained and for the test feature to be quantified. However, this is not mandatory. In particular, the invention can be directly only at the test plan validation, for example within the meaning of a preparation of an implementation or performance of the test plan that is only subsequently carried out.

The accuracy variable, which, in general, can define at least one quantified value or can be such a value, can also be referred to as a measurement uncertainty and/or can specify such a measurement uncertainty. Examples of specific accuracy variables will still be explained below.

The error effect can specify at least one quantified value. This can be a scalar value and/or a value specifying a sequence, for example in order to specify which one of a plurality of possible reference elements has the greatest error effect on the test feature quantification. To this end, for example, the accuracy variable of the reference elements can be compared with one another and/or a sequence can be ascertained on the basis thereof. However, the error effect is preferably ascertained on the basis of an exploited and/or claimed tolerance range of the test feature, explained below, which can be traced back to the considered reference element.

As mentioned, reference elements whose measurement results are used to quantify a test feature can have a dependency relationship with the test feature. Expressed differently, the test feature can be defined and/or ascertainable on the basis of these reference elements such that the test feature can be referred to as being dependent on these reference elements. The reference elements themselves can, however, likewise be dependent on further measurement elements, i.e., the measurement result thereof can be ascertained at least in part on the basis of a measurement result of a further measurement element. Consequently, such further measurement elements can serve at least indirectly as a reference for the test feature and are therefore likewise referred to as reference elements herein.

The method can be computer-implemented and/or carried out at least partly in automatic fashion. In principle, all method steps and method measures explained herein can be performable in automated fashion and/or without targeted user inputs being required to this end. By way of example, a method according to any variant described herein or all measures comprised thereby can be carried out using a computer device of the type disclosed herein.

According to the invention, provision is further made of ascertaining for each error effect whether it meets an error criterion, and should this be the case:

classifying the reference element as a critical reference element.

By way of example, the error criterion can be the exceeding of a predetermined and maximum admissible threshold of the error effect, which may specify a quantified value. The classification may comprise the reference element being provided with a corresponding data-based and/or digital information item or said reference element being assigned such an information item. The classification can be displayed to a user, for example on a display device of a computer device disclosed herein. To this end, a critical reference element can be optically highlighted in a graphically represented test plan, for example. In addition or as an alternative thereto, the reference element can be provided with a corresponding label (e.g., "critical") and/or an error effect (e.g., in the form of a corresponding error effect value) can be displayed.

A development of the method and computer device provides for the fact that the measurement result of the reference element is to be ascertained, or, expressed differently, should be ascertained or is ascertained, on the basis of the measurement result of at least one further reference element. Thus, the above-described dependence of the reference element on at least one further measurement element may be present. Once again, the ascertainment of the measurement result can optionally be comprised by the solution explained herein; however, this is preferably only implemented at a later stage following the validation of the test plan. Then, for this further reference element, too, a (further) error effect on the obtainable accuracy of the quantification is preferably ascertained. This further reference element can accordingly indirectly influence the accuracy of the test feature quantification.

Consequently, it is possible, within the scope of a dependency tree or a dependency broken down over multiple levels, to take into account the reference elements on which the test feature at least indirectly depends and (error) effects on the quantification of the test feature can also be ascertained, in particular, by reference elements for which there only is an indirect dependence. This facilitates an even more accurate analysis of a possible error cause since possible error effects on the quantification of the test feature can be taken into account in even more comprehensive form and over a plurality of dependency levels.

In general, provision can be made for the reference element to be a geometric element of the object. In general, it can also be referred to as a form element or measurement element. In particular, this can be a real, physical geometric element which can be probed within the scope of an object measurement, for example by the coordinate measuring machine. However, it can also be a virtual and/or computationally established geometric element, which is not able to be physically probed but, for example, is determined within the meaning of an auxiliary element on the basis of measurement values for other elements. An example is a point of intersection of bore axes, which lies outside an object volume.

According to one development of the method and of the computer device, the measurement result of the reference element is ascertained on the basis of at least one coordinate value (which may also be referred to as actual value) of this reference element. In particular, the coordinate values can be ascertained on the basis of a real or simulated object measurement. Simulated object measurements are known. Here, real component tolerances and measurement uncertainties can be taken into account by way of random variables. In particular, the ascertainment of coordinate values on the basis of distributions is known within the scope of simulations, said distributions being ascertained, for example, from a Monte Carlo simulation, random distributions or by means of the Box-Muller method. Here, properties of the specifically considered coordinate measuring machine and, in particular, the accuracy class thereof can also be taken into account in each case.

Further, provision can generally be made for the measurement result of the reference element to specify at least one spatial degree of freedom and/or at least one dimension of the reference element. A spatial degree of freedom can be any degree of freedom with which a relative position (i.e., position and orientation) of the reference element is describable, for example in a reference coordinate system. In a manner known per se, three translational and three rotational degrees of freedom, defined in a Cartesian coordinate system, may be provided. The dimension can be an extent along at least one axis of a reference coordinate system.

In this way, the measurement result can be used, for example, to determine a distance or another property of a relative arrangement with respect to the reference element with knowledge of the (preferably complete) spatial relative position and/or the dimension, wherein the dimension or the property can be the test feature.

In a further embodiment of the method and the computer device, the accuracy variable is ascertained on the basis of at least one of the following, wherein the coordinates below can be obtained, in particular, by means of the aforementioned simulations during a purely computer-based test plan validation or within the scope of the real measurement, e.g., of a test object:

A statistical characteristic of a distribution of coordinate values which were determined to ascertain the measurement result of the reference element. By way of example, it is possible to consider a range of the coordinate values and/or a distribution variable such as a standard deviation. In addition or as an alternative thereto, the statistical characteristic can be ascertained on the basis of an adjustment method of the type described below. The accuracy variable can be chosen to be small as a spread, deviation or range of the coordinate values increases.

By way of example, a geometric element can be calculated within the scope of the adjustment method, said geometric element being fitted to a plurality of coordinate values within the scope of fitting (e.g., a circle which is fitted to a plurality of coordinate values captured at a bore edge). Then, for example, a mean deviation of the real coordinate values from the calculated coordinates of the fitted geometric element can be ascertained as a statistical characteristic. The accuracy variable can be chosen to be smaller as the deviation increases.

A deviation of at least one coordinate value from a measurement result, which was calculated from a plurality of coordinate values, for the reference element. In particular, this relates to the case where the measurement result is determined by means of an adjustment method as explained above, for example as a calculated or fitted geometric element. The accuracy variable can be chosen to be smaller as the deviation increases.

An adjustment method which is carried out to calculate the measurement result from a multiplicity of coordinate values. The adjustment method can fit a geometric element of the aforementioned type into a plurality of ascertained coordinate values. By way of example, the geometric element can be a straight line, a circle or a plane. As actual values, the coordinate values typically do not generally lie on or within said geometric element but deviate slightly therefrom. The accuracy variable can be chosen to be smaller as the deviation (e.g., mean or maximum deviation) increases.

A form deviation of the reference element. The form deviation can be calculated in a manner known per se on the basis of coordinate values of the reference element, for example as greatest deviation of the coordinates within a fitted geometry element and/or as a difference of the maximum and minimum coordinates of the measurement points of a fitted geometric element.

In this way, it is also possible to at least indirectly take account of error effects such as, e.g., a general measurement uncertainty and/or surface deviations of the component at a measurement location. Thus, the following can apply in a manner analogous to the explanations made above in respect of the adjustment method: The accuracy variable can be chosen to be smaller as the form deviation increases.

An inherent measurement uncertainty or, expressed differently, a systematic measurement uncertainty of the coordinate measuring machine. Here, this can be a measurement uncertainty which can be traced back, for example, to imperfect kinematics of the coordinate measuring machine. By way of example, inherent measurement uncertainties can be ascertained by means of a standardized method at the manufacturer of a coordinate measuring machine prior to the supply of the latter. In addition or as an alternative thereto, such an ascertainment can be implemented within the scope of a machine acceptance test. The inherent measurement uncertainty can specify a capability of the coordinate measuring machine in respect of the obtainable measurement accuracy. The accuracy variable can be chosen to be smaller as the inherent measurement uncertainty increases.

According to a further embodiment of the method and of the computer device, the error effect of the reference element is determinable on the basis of a possible value spectrum of the measurement result of this reference element, wherein the value spectrum is determined on the basis of the accuracy variable. By way of example, the accuracy variable can be used to define an expected range of variation (or the expected value spectrum) of the measurement result resulting from the measurement. In particular, it is possible to ascertain a possible upper limit and a lower limit of the value spectrum, wherein the upper limit and lower limit each represent possible extremal values of the measurement result.

The value spectrum can be used to determine a resultant variation range of the quantification of the test feature therefrom, in the manner explained below.

In more detail, on the basis of the value spectrum of the reference element, a possible quantification value spectrum of the test feature can be obtained and compared with a (predetermined) admissible tolerance range of the test feature in a further variant of the method and the computer device. By way of example, possible extremal values of a value spectrum can be used to ascertain (external) quantification values of the test feature resulting therefrom. From this, it is possible to determine the expected variation range of the test feature, which arises from the possible value spectrum of the measurement result.

Then, it is possible to check the extent to which this variation range and the admissible tolerance range intersect or the proportion of the tolerance range that is adopted by this variation range. If it becomes apparent that a reference element is measurable in such inaccurate manner that even the quantification values of the test features are subject to increased variations and, for example, adopt more than 10%, more than 20% or more than 50% of the tolerance range, then the error effect can be assessed as critical. This is the case, in particular, if the test feature is dependent on more than one reference element such that a single reference element should only occupy a correspondingly small portion of the tolerance range.

In conclusion, the error criterion can be satisfied, in general, if the quantification value spectrum exceeds an admissible portion of the tolerance range of the test feature. Consequently, the corresponding reference element can then be classified as critical.

According to one development of the method and the computer device, it is ascertained whether the error effect satisfies an error-free criterion (or else a noncritical criterion), and should this be the case:

classifying the reference element as a noncritical reference element.

In a manner analogous to the critical reference elements explained above, all mentioned measures can also be taken up in this case in order to bring the corresponding classification to the operator's attention. In general, this variant offers the advantage that it is possible to communicate to a user the reference elements that must be excluded as sources of error and/or that need not be optimized or measured differently.

In this context, provision can further be made for at least one measurement parameter, on the basis of which a measurement result of the reference element assessed as noncritical is ascertainable and which is preferably defined in the test plan, to be altered for the purposes of obtaining faster measurement speed and/or lower measurement accuracy if the error-free criterion is satisfied.

Expressed differently, the outlay for measuring the reference element assessed as noncritical can thus be reduced and, in particular, the measurement speed can be increased, which is generally accompanied by a less accurate measurement. This can reduce the time required for carrying out the test plan. The lower measurement accuracy may be acceptable in view of the assessment as a noncritical reference element and the achievable time saving.

The measurement parameter can be adapted automatically (i.e., autonomously of the user), for example on the basis of rules saved in advance and/or an adaptation algorithm. Thus, the user can be unburdened of determining the suitable adaptation themselves. Instead, the latter can be saved automatically in the test plan and/or proposed to the user for the final clearance.

Relationships between measurement parameters and the measurement speed are sufficiently well known and can, for example, be stored in the aforementioned algorithm. However, provision can also be made for the user themselves to undertake a corresponding adaptation by way of a manual input.

Likewise, provision can be made for a measurement parameter, on the basis of which a measurement result of the reference element assessed as critical is ascertainable, to be altered for the purposes of obtaining a higher measurement accuracy if the error criterion is satisfied. This, too, can be effected again in automatic fashion or under user control. Relationships between settings of measurement parameters and the measurement accuracies obtainable therewith are sufficiently well known. By way of example, a higher measurement accuracy typically requires lower measurement speeds. The increased time required therewith to carry out the test plan may however be acceptable if this improves the test feature quantification.

Further, the invention relates to a computer device having the features of claim 13.

The computer device can comprise at least one processor device (for example, a microprocessor) in order to work through program instructions. The program instructions can be saved in a (digital) memory device of the computer device. By working through and/or carrying out the program instructions, it is possible to implement all the measurements explained herein.

To obtain the accuracy variable, the computer device can be configured to carry out any variant for ascertaining this accuracy variable mentioned herein or else to read, for example from a memory device and/or a database, an accuracy variable ascertained in any other way.

To ascertain the error effect, the computer device can be configured to carry out any of the ascertainment measures and, in particular, calculation measures explained herein.

To carry out the aforementioned measures, but also any other measure, the computer device can comprise suitable program instructions, algorithms and/or software components, which, for example, are executable by means of a processor device of the computer device.

The computer device may comprise any development and any further feature in order to provide or perform all of the steps, operating states and functions mentioned above or below. In particular, the arrangement may be designed to implement a method according to any of the aspects mentioned above or below. All explanations made in respect of method features and developments thereof can likewise be provided for, or applicable to, the equivalent features of the computer device.

BRIEF DESCRIPTION OF THE DRAWINGS

An embodiment of the invention is explained below on the basis of the accompanying schematic figures. Features that coincide in their nature and/or function may in this case be provided with the same reference signs throughout the figures.

DETAILED DESCRIPTION

Figure 1:
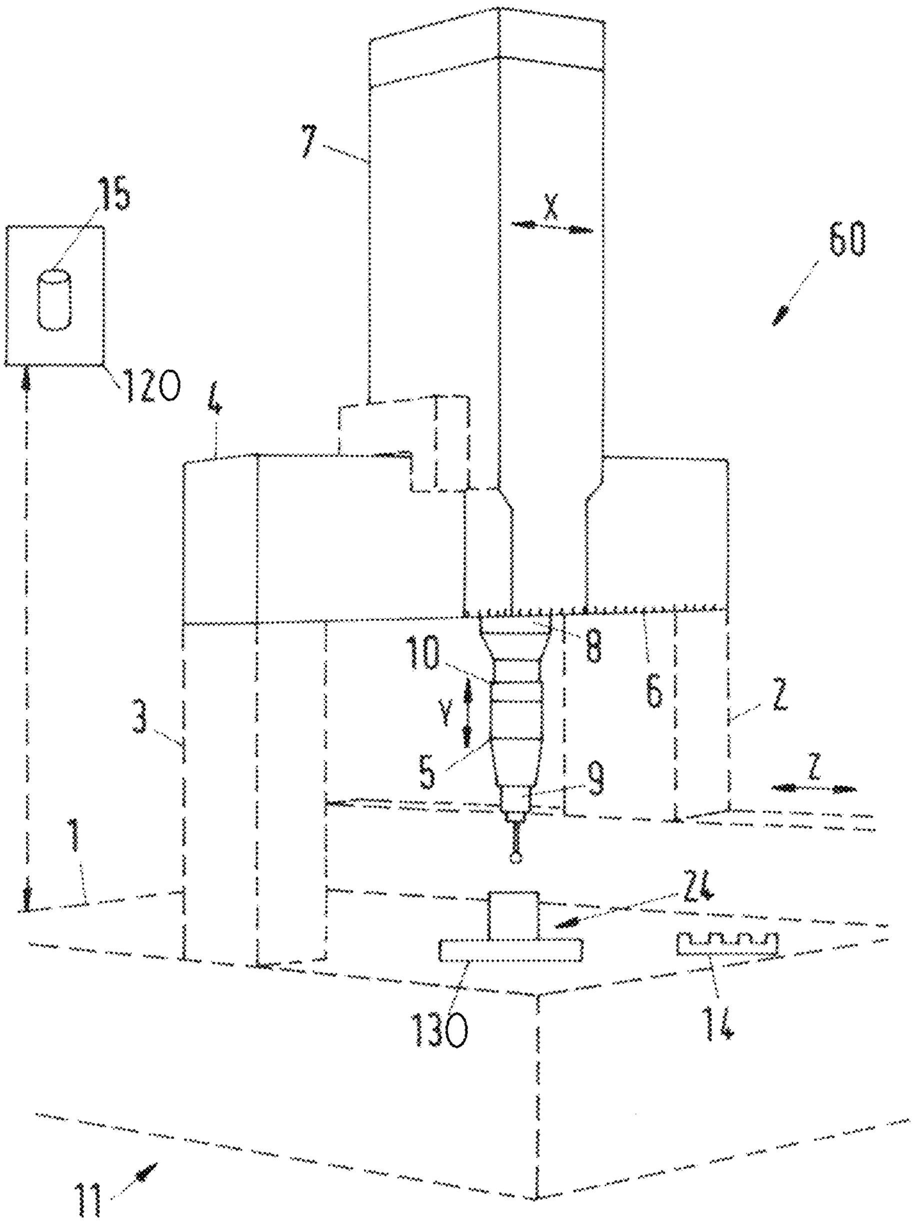
FIG. 1 shows an example of a coordinate measuring machine with a computer device according to the principles of the present disclosure.

FIG. 1 shows a coordinate measuring machine (CMM) 60, which is embodied as a portal-type tactile CMM purely by way of example. An optical CMM could just as easily be used, or a different design or a different kinematic structure. Further, use could alternatively be made of a CMM which, in the style of a computed tomography device, transilluminates workpieces using invasive electromagnetic radiation. In general, the CMM 60 serves to work through a test plan for a measurement object 24 or to measure the object 24 according to the stipulation of this test plan.

In a manner known in principle per se, the CMM 60 has a portal-type embodiment and comprises a measuring table 1 and columns 2, 3, which together with a crossbeam 4 form a portal of the CMM 60 and are displaceable over said measuring table. The crossbeam 4 is connected at its opposite ends to the columns 2 and 3, respectively, which are mounted longitudinally displaceably on the measuring table 1.

The crossbeam 4 is combined with a cross slide 7, which is movable, by way of air bearings, along the crossbeam 4 (in the X-direction). The current position of the cross slide 7 relative to the crossbeam 4 can be determined on the basis of a scale graduation 6. A quill 8, which is movable in the vertical direction, is mounted on the cross slide 7 and connected at its lower end to a measurement sensor 5 by way of a mounting device 10. Removably arranged on the measurement sensor 5 is a probe head 9, which senses in a tactile manner. Instead of the probe head 9, the measurement sensor 5 could similarly comprise a contactlessly sensing sensor, such as a laser sensor.

Arranged on the measuring table 1 is a measuring table 130, on which there is arranged a measurement object 24, which should be measured according to the stipulation of a test plan and which can be turned about a vertical axis of rotation by rotation of the measuring table 130. Also arranged on the measuring table 1 is a magazine 140, in which various probe heads that can be exchanged for the probe head 9 may be arranged, or in which various styluses that can be exchanged for the stylus carried on the probe head 9 may be arranged.

Further, FIG. 1 schematically shows a computer device 120 according to one example embodiment of the invention, wherein the computer device 120 is embodied as a control device of the CMM 60. The computer device 120 includes a processor device (not illustrated separately), software or program instructions, and at least one data memory 150. The computer device 120 is connected by way of signal and control lines to activatable components of the CMM 60, in particular to drives. Moreover, the computer device 120 is connected by way of a measurement data connection to those elements of the CMM 60 that are used for determining measurement values obtained on the basis of the test plan. Since such elements and devices are generally known in the field of CMMs 60, they are not discussed in detail here.

The computer device 120 receives and/or generates a test plan for an object 24 to be measured in accordance with this test plan. In the shown case, the computer device 120 also validates the test plan by means of a method according to the invention. It is likewise possible for the computer device 120 to be provided separately from the CMM 60, for example as a conventional PC in an office. Then, the CMM 60 would comprise a conventional control device, which carries out the test plan validated by the computer device 120.

Figure 2:
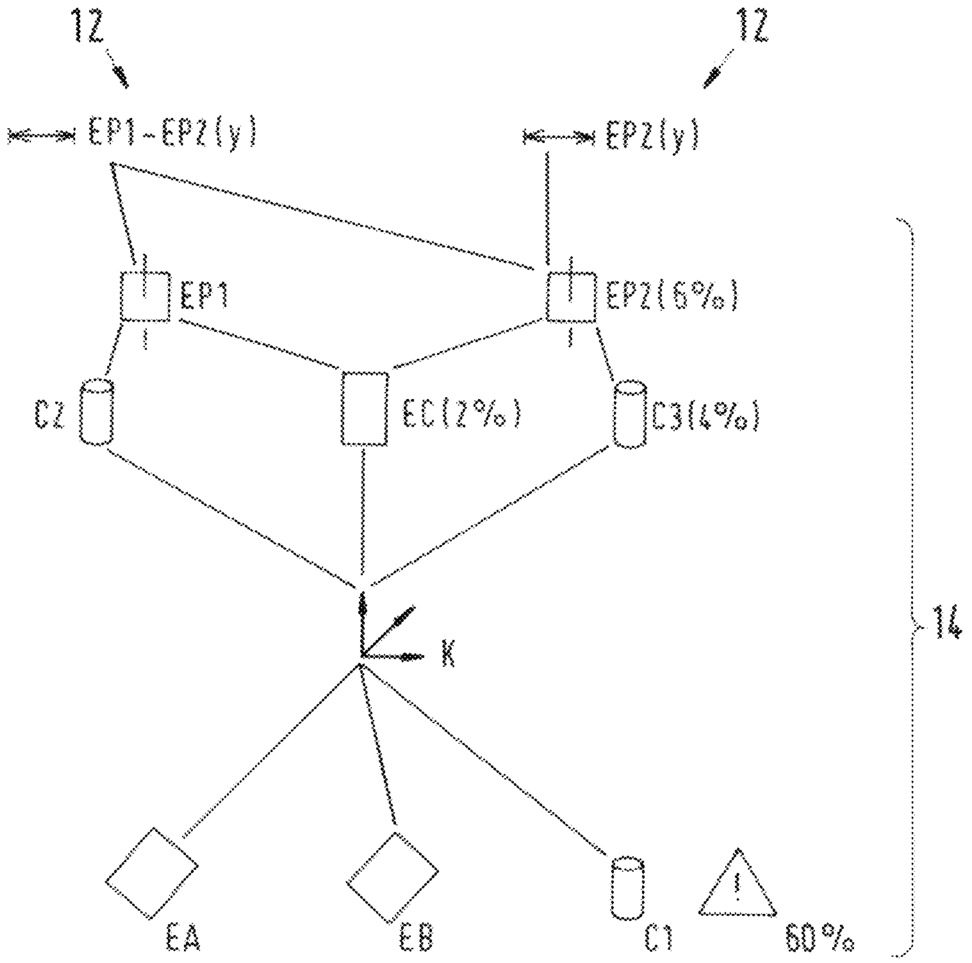
FIG. 2 shows a schematically illustrated test plan with dependencies between the test feature and reference elements for the purposes of explaining the method according to the principles of the present disclosure.

FIG. 2 shows test features 12 and reference elements (measurement elements) 14 of a test plan. The illustration can also be referred to as a dependency tree and can be displayed in this form on a display device of the computer device 120 not illustrated in FIG. 1.

The test features 12 and reference elements 14 are each provided with symbols and with identifying reference signs, which can likewise be displayed. Further, percentage specifications are shown in some of the reference elements 14; these can in turn be displayed to an operator and, in the manner explained below, specify a portion of a tolerance range of a test feature claimed by a reference element.

All measurement elements of FIG. 2 are referred to as reference elements since at least one of the test features 12 and, more precisely, the quantification thereof is at least indirectly dependent on each of the reference elements 14.

Planes EA, EB, EC, cylinders C1, C2 and plane intersection points EP1, EP2 are shown as reference elements 14. Further, a reference coordinate system K is also shown; it is not a geometric feature or measurement element of the object to be measured.

The dependencies of FIG. 2 are explained below from bottom to top. Initially, the spatial relative position (i.e., position and orientation) of two planes EA, EB of the object that are at an angle to one another is ascertained. This relative position forms the measurement result ascertained for these reference elements 14.

To this end, a plurality of measurement points at the object surface are captured in each case in the region of these planes EA, EB and consequently the spatial coordinates are determined for each of the planes EA, EB. Further, a cylinder C1 (i.e., a cylindrical region of the object) is captured, for the purposes of which a plurality of surface points of the cylinder C1 are likewise probed. The cylinder C1 is oriented relative to the planes EA, EB in such a way that the alignment of a reference coordinate system K can be ascertained therefrom. Options for generating corresponding reference coordinate systems K by probing selected measurement elements are known to a person skilled in the art and will therefore not be explained in more detail in the present case. The reference coordinate system K serves as a reference for quantifying the test features 12, for example if distances should be ascertained in predetermined directions or along predetermined axes.

After the alignment of the reference coordinate system K was ascertained, further reference elements 14 in the form of two cylinders C2, C3 and a plane EC are then probed or measured. Once again, the spatial relative positions of these reference elements 14 are in turn determined as respective measurement results.

On the basis thereof, the spatial coordinates of the points of intersection EP1, EP2 of the plane EC with the cylinders C2, C3 are determined as measurement elements determined purely by calculation or as reference element 14, and as a further measurement result. This is implemented by means of known geometric calculations on the basis of the ascertained relative positions and the coordinates of the plane EC and the cylinders C2, C3.

Then, two distances are tested and quantified as test features 12. Purely by way of example, this is a distance EP1-EP2 between the two points of intersection EP1, EP2 and a distance of one of the points of intersection EP2 from an origin of the reference coordinate system K. The label (Y) in FIG. 2 specifies that the distances should be ascertained along the Y-axis of the reference coordinate system K (i.e., in the Y-direction).

In FIG. 2, dependencies between the reference elements 14 and, in particular, test features 12 as well are marked by means of the lines. It is possible to identify that the test feature 12 relating to the distance of one of the points of intersection EP2 from an origin of the reference coordinate system K depends directly and immediately on the ascertained relative position (i.e., the measurement result ascertained by calculation) of the point of intersection EP12. The latter, in turn, depends on the cylinders C2, C3 and the plane EC, or is defined thereby. Consequently, the corresponding test feature 12 or its quantification depends at least indirectly also on the cylinder C2, C3 and the plane EC.

Since the distance in relation to the reference coordinate system K should be ascertained using the corresponding test feature 12, there is also at least an indirect dependence on the planes EA, EB and the cylinder C1 measured at the outset.

Similarly, the further test feature 12 relating to the distance between the individual plane intersection points EP1, EP2 is also dependent on all further reference elements 14.

The measurement results (i.e., the ascertained coordinate values and/or spatial relative positions) of the reference elements 14 consequently influence the values which ultimately are ascertained for the test features 12.

The invention provides for these (error) effects to be ascertained and preferably to also be displayed directly to an operator. In the process, the effects are quantified and reference elements 14 are classified as critical if predetermined error criteria are satisfied.

In the shown example, percentage specifications are plotted for selected reference elements 14 and, in particular, directed at the test feature 12 which relates to the distance measurements from the coordinate origin, which percentage specifications specify the error effects of the reference elements 14 on the quantification of the corresponding test feature 12. Here, these are the already mentioned portions of a used tolerance range of the test feature 12.

For the cylinder C1, which has the percentage specification 60%, there moreover is visual highlighting of the fact that this is a critical reference element 14. This is therefore the case because exceeding a maximum admissible portion of the tolerance range of (purely by way of example) 20% is defined as error criterion.

Consequently, the operator can identify which reference element 14 has the greatest error effect and, in particular, a critical error effect on the quantification of a test feature 12 to be checked. The measurement of critical reference elements 14 can then be adapted in a targeted manner in order to improve the obtainable accuracy, for example by lowering a measurement speed or by increasing a number of probed points. To this end, suitable adaptations of corresponding measurement parameters can be ascertained automatically and proposed to the operator. Optionally, these adaptations can also be effectuated or implemented automatically. Choosing other reference elements 14 or replacing critical reference elements 14 by other reference elements 14 to be measured could also be considered for an adaptation.

Figure 3:
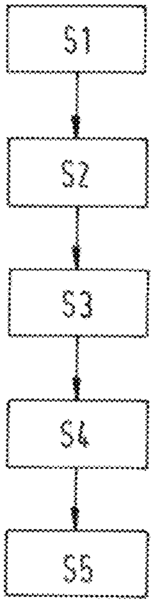
FIG. 3 shows a general flowchart of a method according to the principles of the present disclosure.

FIG. 3 shows the procedure explained above on the basis of a flowchart, which generally illustrates a procedure of a method according to the invention.

Data in respect of the object to be measured are obtained in a step S1, for example as a CAD data record.

In a step S2, test features 12 to be checked are defined, for example by an operator. In a manner known per se, the reference elements 14 for ascertaining the test features 12 which should be measured can then be defined (preferably in at least partly automated fashion and/or by further user inputs). As a result of this, the dependencies between the reference elements 14 and the test features 12 are also defined or can be derived therefrom.

Accuracy variables for the reference elements 14 are obtained in a step S3. By way of example, these accuracy variables can be read from a database or be obtained from another computer device. Individual accuracy variables can also be ascertained for at least some of the reference elements 14, for example if these are determined in the manner described above on the basis of fit or adjustment calculations.

However, if, for example, the accuracy variable is an inherent measurement uncertainty of the CMM 60, provision can be made for the same accuracy variable to be considered at least for some of the reference elements 14.

In a step S4, the error effects of those reference elements 14 on which this test feature 12 depends at least indirectly are ascertained for each test feature 12. By way of example, this can be implemented in the manner explained below on the basis of the example of FIGS. 4A-4C and by resorting to the accuracy variable.

Then, whether reference elements 14 should be classified as critical is ascertained in a step S5 on the basis of the error effects. If this is the case, this can be displayed to an operator in FIG. 2 and, if need be, adaptations can be prompted or implemented automatically.

Figure 4A:
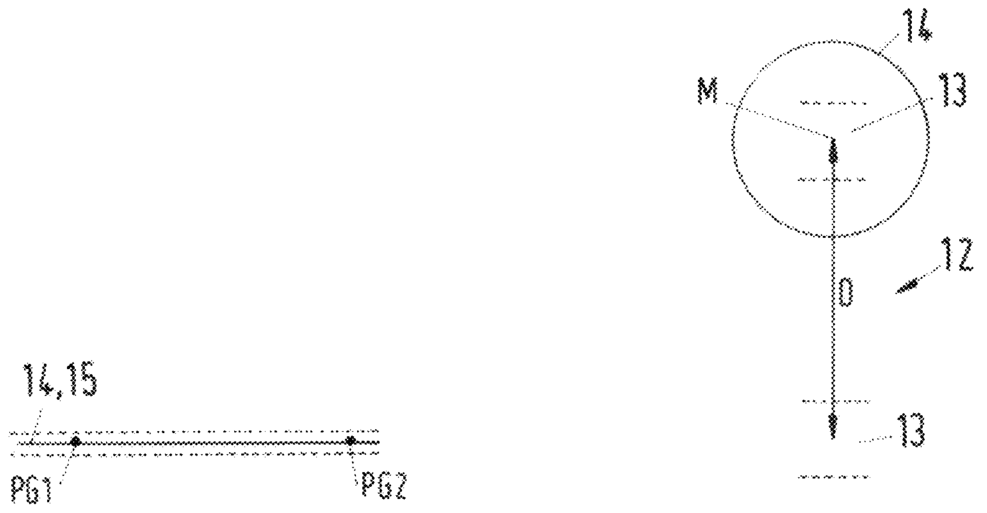
FIGS. 4A-C show an option for determining an error effect according to one variant of the method according to the principles of the present disclosure.
Figure 4B:
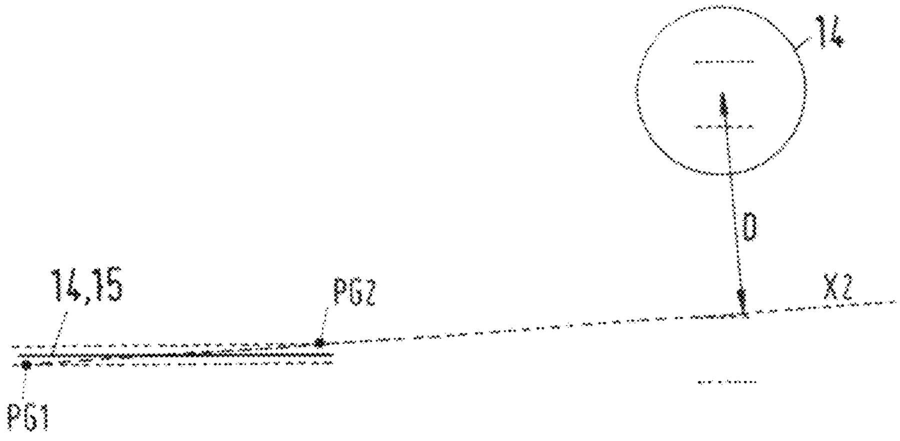
Figure 4C:
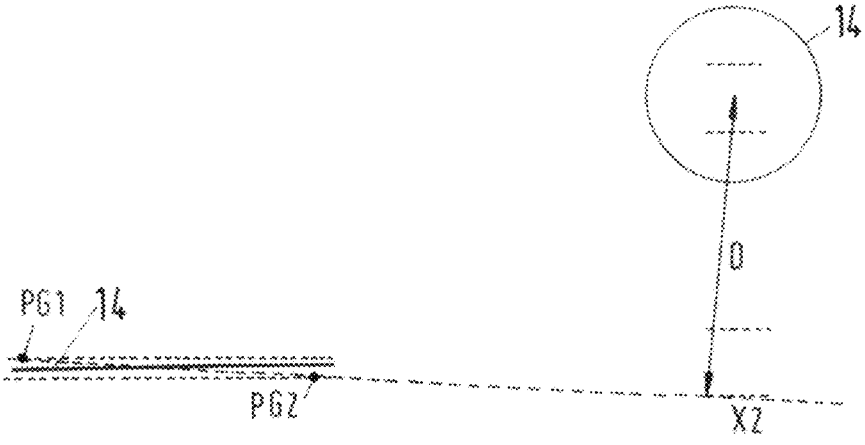

FIGS. 4A-4C illustrate an example for ascertaining the error effect of a reference element 14 on a test feature 12. Here, a distance D between a circle center M of a circular reference element 14 and a straight line 15, in the vertical direction in the shown example, is ascertained as test feature 12. Here, only the error effect of the straight line 15 is considered purely in example fashion. However, an error effect of the circular reference element 14 is ascertainable in analogous fashion.

For the straight line 15, an inherent measurement uncertainty of the employed coordinate measuring machine 60 is considered as accuracy variable. This measurement uncertainty is plotted as a tolerance range around the straight line 15. This should express that a relative position of the straight line 15 can also be obtained as a measurement result at any position within this tolerance range. Consequently, the tolerance range represents a possible value spectrum of the measurement result of the straight line 15. In a manner known per se, this measurement result is ascertained by capturing the coordinates of two points PG1, PG2 of the straight line 15.

The tolerance range 13 is also plotted for the distance D and the center M of the circular reference element 14. The tolerance range 13 of the center M is likewise ascertained from an associated accuracy variable; however, it is not considered in any more detail in the following abbreviated presentation. The tolerance range 13 of the distance D (the lower tolerance range 13 in FIG. 4A) is ascertained as explained below and forms (at least in part) a possible value spectrum of the quantification of the "distance" test feature. This value spectrum can also be influenced by the upper tolerance range 13 of the center M; however, as a simplification, this is not considered in any more detail.

Extremal situations which may lead to the greatest possible value variations of this distance D are considered for the purposes of ascertaining the tolerance range 13 of the distance D. In detail, extremal values or extremal profiles of the straight line 15 are considered as per an upper boundary and lower boundary of the possible value spectrum of this reference element 14 or its relative position ascertained as a measurement result. Here, the term "extremal" relates to the effects on the quantification of the considered test feature, specifically that the latter assumes either a maximum or minimum value.

FIG. 4B represents an extremal situation or a first limit of the measured relative position of the straight line 15, which leads to the greatest possible reducing effect on the distance D. This is present when the straight line 15 has the profile indicated by dashed lines. By way of example, such a profile may set in if the measured coordinates of the first point PG1 of the straight line 15 are affected by the maximum measurement uncertainty in a first (e.g., negative) way or with such a sign and the measured coordinates of the second point PG2 are affected by the measurement uncertainty in the opposite way.

FIG. 4C shows the reverse case, where the points PG1, PG2 are each influenced in the opposite way (e.g., PG1 is maximally positive and PG2 is maximally negative). As a result of this, the greatest possible distance D is obtained, i.e., the greatest possible (or maximizing) error effect of the measured relative position of the straight line 15 on the distance D ascertained as test feature 12.

In conclusion, an accuracy variable relating to the accuracy with which a relative position of the straight line 15 is ascertainable as measurement result thus underlies the ascertainment of the error influence of this reference element 14 on the quantification of the test feature. By way of example, this error effect can be defined as the bandwidth of the value spectrum or of the tolerance range 13 of the distance D and/or can be quantified on the basis thereof. Then, the error effect can be compared to an error criterion, wherein the error criterion may, for example, specify a maximum admissible extent of the corresponding value spectrum or tolerance range 13. This renders determinable whether or not the error effect of the straight line 15 and, in particular, the measurement thereof or the possible measurement value spectrum should be classified as critical.

Figure 5A:
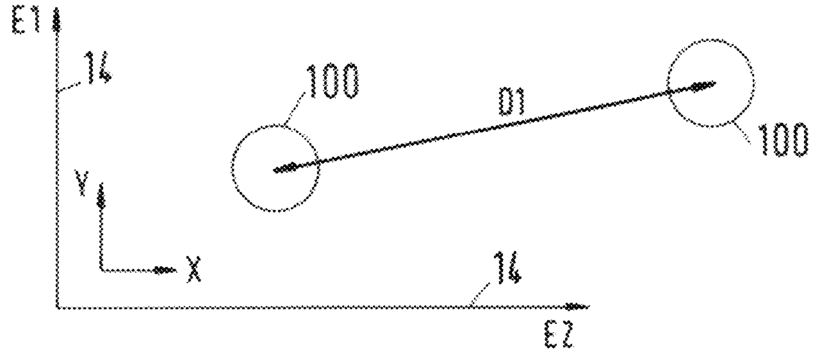
FIGS. 5A-B show a further example of an error effect according to a further variant of the method according to the principles of the present disclosure.
Figure 5B:
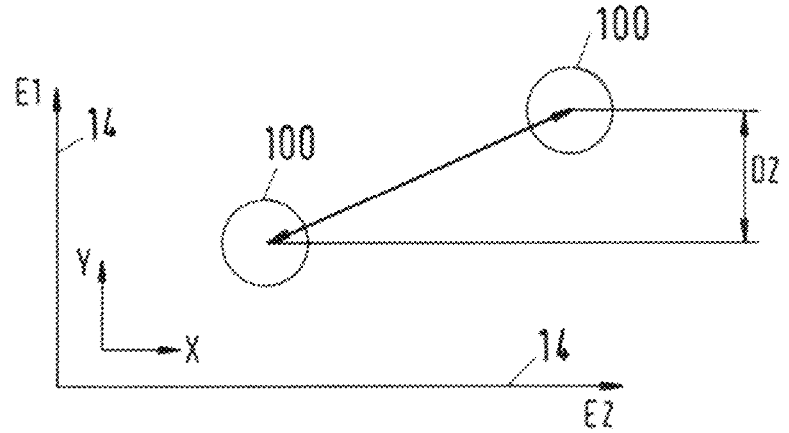

FIGS. 5A-B show a further example for ascertaining the error effect, to be precise for ascertaining a distance between two circles 100. Here, a coordinate system is defined by two planes E1, E2, which each form reference elements 14. In a manner known per se, the relative position of planes can be ascertained, for example, by probing three points in this plane.

The planes E1, E2 are perpendicular to the plane of the sheet and, ideally, perpendicular to one another. They define the alignment of an XY-coordinate system, the axes of which ideally are perpendicular to one another. Here, the XY-axes extend parallel to a respective plane E1, E2.

In FIG. 5A, a direct distance D1 between the circles 100 is ascertained as test feature 12. The reference elements 14 have no influence thereon.

The distance D2 in Y is calculated as test feature 12 in FIG. 5B. The plane E1 has a significant influence thereon as it decisively defines the orientation of the Y-alignment or Y-coordinate axis. Then, in a manner analogous to the previous example, it is possible to ascertain how an expectable variation of the plane E1, expectable as it is afflicted by tolerances, affects an expected value spectrum of this distance D2.

The phrase "at least one of A, B, and C" should be construed to mean a logical (A OR B OR C), using a non-exclusive logical OR, and should not be construed to mean "at least one of A, at least one of B, and at least one of C." As used in the claims, the term "set" generally means a grouping of one or more elements.

What is claimed is:

1. A computer-implemented method comprising:

obtaining a test plan for measurement of an object with a coordinate measuring machine that includes a measurement sensor, wherein:
- the test plan includes a test feature to be quantified within a scope of the measurement, and
- a quantification of the test feature is implemented based on a set of measurement results of a set of reference elements of the object by the coordinate measuring machine;

for each reference element of the set of reference elements, obtaining an accuracy variable that specifies an accuracy of the measurement result of the reference element;

ascertaining an error effect of each reference element of the set of reference elements on the quantification of the test feature based on the respective accuracy variable;

at least one of:
- ascertaining whether each of the error effects meets an error-free criterion and in response to one of the error effects meeting the error-free criterion:
  - classifying the reference element assigned to this error effect as a noncritical reference element; and
  - automatically adapting the test plan to measure the noncritical reference element by adjusting at least one parameter that governs the measurement of the object by the coordinate measuring machine during execution of the test plan to obtain a faster measurement speed; and
- ascertaining whether each of the error effects meets an error criterion and in response to one of the error effects meeting the error criterion:
  - classifying the reference element assigned to this error effect as a critical reference element; and
  - at least one of:
    - automatically adapting the test plan to measure the critical reference element by adjusting at least one parameter that governs the measurement of the object by the coordinate measuring machine during execution of the test plan to obtain a higher measurement accuracy; and
    - ascertaining, proposing, and/or implementing a set of countermeasures, wherein the set of countermeasures includes an adaptation of the measurement of the critical reference element, a new definition of the test feature, and/or a new selection of the reference element to be measured in response to the error criterion being satisfied; and controlling the coordinate measuring machine to measure the object according to at least one of an adapted test plan and the set of countermeasures by moving at least one of the measurement sensor and the object to measure at least one of the noncritical reference element and the critical reference element.

2. The method of claim 1 wherein:

the set of measurement results of the set of reference elements is ascertained based on a measurement result of a further reference element; and an error effect on an achievable accuracy of the quantification is also ascertained for the further reference element.

3. The method of claim 1 wherein each reference element of the set of reference elements is a geometric element of the object.

4. The method of claim 1 wherein the measurement result of a reference element is ascertained in each case based on at least one coordinate value of the reference element.

5. The method of claim 4 wherein the coordinate value is ascertained based on at least one of a real object measurement and a simulated object measurement.

6. The method of claim 1 wherein the measurement result of a reference element in each case specifies at least one of a spatial degree of freedom and a dimension of the reference element.

7. The method of claim 1 wherein the accuracy variable is ascertained based on a statistical characteristic of a distribution of coordinate values that were determined to ascertain the measurement result of a respective reference element.

8. The method of claim 1 wherein the accuracy variable is ascertained based on a deviation of at least one coordinate value from a measurement result that was calculated from a plurality of coordinate values for a respective reference element.

9. The method of claim 1 wherein the accuracy variable is ascertained based on an adjustment method that is carried out to calculate the measurement result from a multiplicity of coordinate values.

10. The method of claim 1 wherein the accuracy variable is ascertained based on a form deviation of a respective reference element.

11. The method of claim 1 wherein the accuracy variable is ascertained based on an inherent measurement uncertainty of the coordinate measuring machine.

12. The method of claim 1 wherein:

the error effect of a respective reference element is determined based on a possible value spectrum of the measurement result of a respective reference element; and the value spectrum is determined based on the accuracy variable.

13. The method of claim 12 further comprising, based on the value spectrum of a respective reference element, ascertaining a possible quantification value spectrum of the test feature and comparing to an admissible tolerance range of a respective test feature.

14. The method of claim 13 wherein the error criterion is satisfied when the quantification value spectrum exceeds an admissible portion of the tolerance range of a respective test feature.

15. The method of claim 1 further comprising:

ascertaining whether the error effect of a respective reference element satisfies an error criterion; and in response to the error effect satisfying the error criterion, classifying a corresponding reference element as a critical reference element.

16. The method of claim 1 wherein the set of countermeasures are ascertained, proposed, and/or implemented automatically.

17. A machine comprising:

memory storing a test plan for measurement of an object with a coordinate measuring machine, wherein:

the coordinate measuring machine includes a measurement sensor, the test plan includes a test feature to be quantified within a scope of the measurement, and a quantification of the test feature is implemented based on a set of measurement results of a set of reference elements of the object by the coordinate measuring machine; and at least one processor configured to execute instructions stored in the memory, wherein the instructions include:

for each reference element of the set of reference elements, obtaining an accuracy variable that specifies an accuracy of the measurement result of the reference element;

ascertaining an error effect of each reference element of the set of reference elements on the quantification of the test feature based on the respective accuracy variable;

at least one of:

ascertaining whether each of the error effects meets an error-free criterion and in response to one of the error effects meeting the error-free criterion:

classifying the reference element assigned to this error effect as a noncritical reference element; and automatically adapting the test plan to measure the noncritical reference element by adjusting at least one parameter that governs the measurement of the object by the coordinate measuring machine during execution of the test plan to obtain a faster measurement speed; and ascertaining whether each of the error effects meets an error criterion and in response to one of the error effects meeting the error criterion:

classifying the reference element assigned to this error effect as a critical reference element; and at least one of:

automatically adapting the test plan to measure the critical reference element by adjusting at least one parameter that governs the measurement of the object by the coordinate measuring machine during execution of the test plan to obtain a higher measurement accuracy; and ascertaining, proposing, and/or implementing a set of countermeasures, wherein the set of countermeasures includes an adaptation of the measurement of the critical reference element, a new definition of the test feature, and/or a new selection of the reference element to be measured in response to the error criterion being satisfied; and controlling the coordinate measuring machine to measure the object according to at least one of an adapted test plan and the set of countermeasures by moving at least one of the measurement sensor and the object to measure at least one of the noncritical reference element and the critical reference element.

18. A non-transitory computer-readable medium comprising processor-executable instructions that include:

obtaining a test plan for measurement of an object with a coordinate measuring machine that includes a measurement sensor, wherein:

the test plan includes a test feature to be quantified within a scope of the measurement, and a quantification of the test feature is implemented based on a set of measurement results of a set of reference elements of the object by the coordinate measuring machine;

for each reference element of the set of reference elements, obtaining an accuracy variable that specifies an accuracy of the measurement result of the reference element;

ascertaining an error effect of each reference element of the set of reference elements on the quantification of the test feature based on the respective accuracy variable;

at least one of:

ascertaining whether each of the error effects meets an error-free criterion and in response to one of the error effects meeting the error-free criterion:

classifying the reference element assigned to this error effect as a noncritical reference element; and automatically adapting the test plan to measure the noncritical reference element by adjusting at least one parameter that governs the measurement of the object by the coordinate measuring machine during execution of the test plan to obtain a faster measurement speed; and ascertaining whether each of the error effects meets an error criterion and in response to one of the error effects meeting the error criterion:

classifying the reference element assigned to this error effect as a critical reference element; and at least one of:

automatically adapting the test plan to measure the critical reference element by adjusting at least one parameter that governs the measurement of the object by the coordinate measuring machine during execution of the test plan to obtain a higher measurement accuracy; and ascertaining, proposing, and/or implementing a set of countermeasures, wherein the set of countermeasures includes an adaptation of the measurement of the critical reference element, a new definition of the test feature, and/or a new selection of the reference element to be measured in response to the error criterion being satisfied; and controlling the coordinate measuring machine to measure the object according to at least one of an adapted test plan and the set of countermeasures by moving at least one of the measurement sensor and the object to measure at least one of the noncritical reference element and the critical reference element.

* * * * *